(12) United States Patent
Takase et al.

(10) Patent No.: US 11,267,411 B2
(45) Date of Patent: Mar. 8, 2022

(54) VEHICLE UPHOLSTERY MEMBER

(71) Applicant: HONDA MOTOR CO., LTD., Tokyo (JP)

(72) Inventors: Tsutomu Takase, Wako (JP); Ikuo Shimada, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 63 days.

(21) Appl. No.: 16/718,541

(22) Filed: Dec. 18, 2019

(65) Prior Publication Data

US 2020/0207287 A1 Jul. 2, 2020

(30) Foreign Application Priority Data

Dec. 28, 2018 (JP) .............................. JP2018-246467

(51) Int. Cl.
*B60R 13/02* (2006.01)
*B32B 3/12* (2006.01)
*B32B 3/30* (2006.01)

(52) U.S. Cl.
CPC ............ *B60R 13/0256* (2013.01); *B32B 3/12* (2013.01); *B32B 3/30* (2013.01); *B32B 2605/003* (2013.01)

(58) Field of Classification Search
CPC ................................................. B60R 13/0256
See application file for complete search history.

(56) References Cited

U.S. PATENT DOCUMENTS

| 10,836,328 B2 * | 11/2020 | Takase ................ B60R 13/0256 |
| 2008/0135167 A1 * | 6/2008 | Simmons .................. B32B 3/28 |
| | | 156/245 |
| 2008/0301986 A1 * | 12/2008 | Quin ....................... G09F 19/14 |
| | | 40/446 |
| 2012/0196086 A1 | 8/2012 | Shimizu et al. |
| 2017/0231105 A1 | 8/2017 | Abe et al. |

FOREIGN PATENT DOCUMENTS

| JP | 2005014374 A | * | 1/2005 |
| JP | 2007050644 A | | 3/2007 |
| JP | WO2011043117 A1 | | 3/2013 |
| JP | 2015189209 A | | 11/2015 |
| JP | WO2016027391 A1 | | 7/2017 |

OTHER PUBLICATIONS

English language translation of JP 2005-014374A, generated on Jun. 10, 2021 with Japanese Platform for Patent Information website (https://www.j-platpat.inpit.go.jp/) (Year: 2005).*
Notice of Reasons for Refusal for Patent Application JP 2018-246467 received Nov. 2, 2021; 7 pp.

* cited by examiner

*Primary Examiner* — Mark Ruthkosky
*Assistant Examiner* — Julia L Rummel
(74) *Attorney, Agent, or Firm* — Armstrong Teasdale LLP (57) ABSTRACT

A vehicle upholstery member includes a base member extending along a predetermined principal plane. The base member includes multiple regions each having a predetermined basic shape, each of the regions is provided with a flat surface having a center located on a common hypothetical reference plane parallel with the principal plane, and the flat surface of each region forms an angle relative to the hypothetical reference plane such that the flat surface of the region extends in a tangential direction of a three-dimensional hypothetical surface defined along the principal plane at a position corresponding to the center of the region.

9 Claims, 10 Drawing Sheets

Fig.7A first three-dimensional hypothetical surface

Fig.7B second three-dimensional hypothetical surface

Fig.7C third three-dimensional hypothetical surface

Fig.8A first three-dimensional hypothetical surface

Fig.8B second three-dimensional hypothetical surface

Fig.8C third three-dimensional hypothetical surface

Fig.9A first three-dimensional
hypothetical surface

Fig.9B second three-dimensional
hypothetical surface

Fig.9C third three-dimensional
hypothetical surface

Fig.10A first three-dimensional
hypothetical surface

Fig.10B second three-dimensional
hypothetical surface

Fig.10C third three-dimensional
hypothetical surface

VEHICLE UPHOLSTERY MEMBER

TECHNICAL FIELD

The present invention relates to a vehicle upholstery member used in an instrumental panel or the like of an automobile.

BACKGROUND ART

It is known to use a decorative panel having a pattern of wood grain or the like as an instrumental panel or a door interior panel to enhance the luxury of the passenger compartment of an automobile. Regarding such a decorative panel, it is proposed to use 3D decorative molding technology to significantly enhance the texture of the decorative panel (see JP2007-50644A, for example).

The aforementioned conventional technology can give a wood texture to a decorative panel made by molding a synthetic resin, but cannot reproduce the disturbance of a water surface, for example, on the decorative panel made. If the decorative panel used in the passenger compartment (vehicle upholstery member) can reproduce the disturbance of a water surface, it would create an impressive atmosphere in the passenger compartment. Thus, there is room for improving the ornamental effect of the vehicle upholstery member.

SUMMARY OF THE INVENTION

A primary object of the present invention is to improve the ornamental effect of the vehicle upholstery member.

To achieve such an object, one embodiment of the present invention provides a vehicle upholstery member (1), comprising a base member (11) extending along a predetermined principal plane (12), wherein the base member includes multiple regions (21) each having a predetermined basic shape, each of the regions is provided with a flat surface (31) having a center (42) located on a common hypothetical reference plane (41) parallel with the principal plane, and the flat surface of each region forms an angle ($\theta$) relative to the hypothetical reference plane such that the flat surface of the region extends in a tangential direction of a three-dimensional hypothetical surface (51, 52, 53) defined along the principal plane at a position corresponding to the center of the region.

According to this arrangement, it is possible to cause a viewer to observe, on the surface of the base member, a pattern corresponding to the three-dimensional hypothetical surface, whereby the ornamental effect of the vehicle upholstery member can be improved.

In the above vehicle upholstery member, preferably, the regions include multiple groups of regions, the regions of different groups being arranged in a two-dimensionally alternating manner, and the three-dimensional hypothetical surface includes mutually different multiple three-dimensional hypothetical surfaces (51, 52, 53) corresponding to the respective groups of regions, each three-dimensional hypothetical surface consisting of a smooth continuous curved surface or a contour of a prescribed pattern.

According to this arrangement, it is possible to cause the viewer to observe, on the surface of the base member, different patterns corresponding to the respective three-dimensional hypothetical surfaces and the patterns provide varying ornamental effects depending on the viewing angle, whereby the ornamental effect of the vehicle upholstery member is improved.

In the above vehicle upholstery member, preferably, the regions (21) have a same basic shape.

According to this arrangement, the pattern formed by the regions of the base member can be made conspicuous on the surface of the base member, whereby the ornamental effect of the vehicle upholstery member can be improved.

In the above vehicle upholstery member, preferably, the basic shape of the regions (21) is selected from a group consisting of an equilateral triangle, a square, and a regular hexagon.

According to this arrangement, the regions can be arranged densely so that the pattern formed by the regions can be represented clearly.

In the above vehicle upholstery member, preferably, each side of each region (21) is arranged to extend along a side of another region adjacent thereto.

According to this arrangement, the regions can be arranged densely so that the pattern formed by the regions can be represented clearly.

In the above vehicle upholstery member, preferably, the regions are substantially closely packed together.

Thereby, the pattern formed by the regions can be represented clearly.

In the above vehicle upholstery member, preferably, a groove (33) is formed at a boundary between adjacent ones of the regions.

According to this arrangement, the surface of each region can be formed to be flat to a marginal part thereof easily and the outline of each region can be made clear. This can make the pattern formed by the regions clear.

In the above vehicle upholstery member, preferably, the base member (11) is formed of a resin.

According to this arrangement, the vehicle upholstery member can be formed easily.

In the above vehicle upholstery member, preferably, the base member (11) constitutes an instrumental panel (2).

According to this arrangement, the ornamental effect of the instrumental panel can be improved.

In the above vehicle upholstery member, preferably, the basic shape of each region (21) is a regular hexagon, the multiple groups of regions include first to third region groups, and the multiple three-dimensional hypothetical surfaces include first to third three-dimensional hypothetical surfaces (51, 52, 53) respectively corresponding to the first to third region groups.

According to this arrangement, the vehicle upholstery member can cause the viewer to observe, on the surface of the base member, different patterns corresponding to the three three-dimensional hypothetical surfaces and the patterns provide varying ornamental effects depending on the viewing angle, whereby the ornamental effect of the vehicle upholstery member is improved.

In the above vehicle upholstery member, preferably, the vehicle upholstery member further comprises a clear layer (13) covering the regions (21) and having a flat outer surface.

According to this arrangement, the regions of the base member can be protected from damage.

Thus, according to the above arrangement, it is possible to cause a viewer to observe, on the surface of the base member, a pattern corresponding to the three-dimensional hypothetical surface and thus, the ornamental effect of the vehicle upholstery member can be improved.

BRIEF DESCRIPTION OF THE DRAWINGS

FIG. 6B-1 is a sectional view taken along line B1-B1 in FIG. 6A;

FIG. 6B-2 is a sectional view taken along line B2-B2 in FIG. 6A;

FIG. 6B-3 is a sectional view taken along line B3-B3 in FIG. 6A;

DESCRIPTION OF THE PREFERRED EMBODIMENT(S)

In the following, embodiments of the present invention will be described with reference to the drawings.

Figure 1:
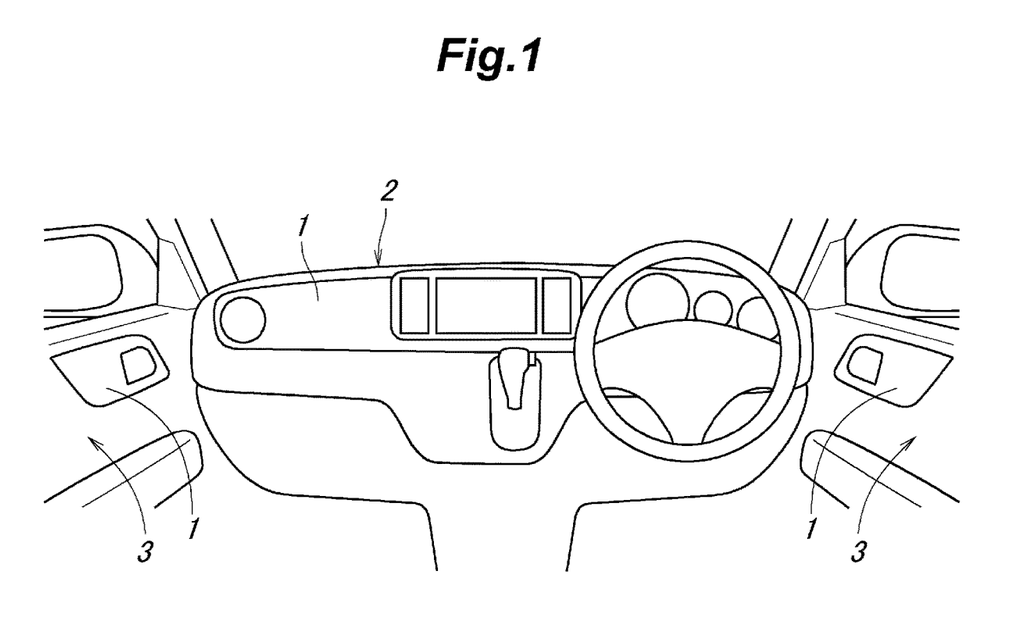
FIG. 1 is a perspective view showing a passenger compartment of an automobile in which a vehicle upholstery member according to an embodiment of the present invention is adopted.
Figure 2:
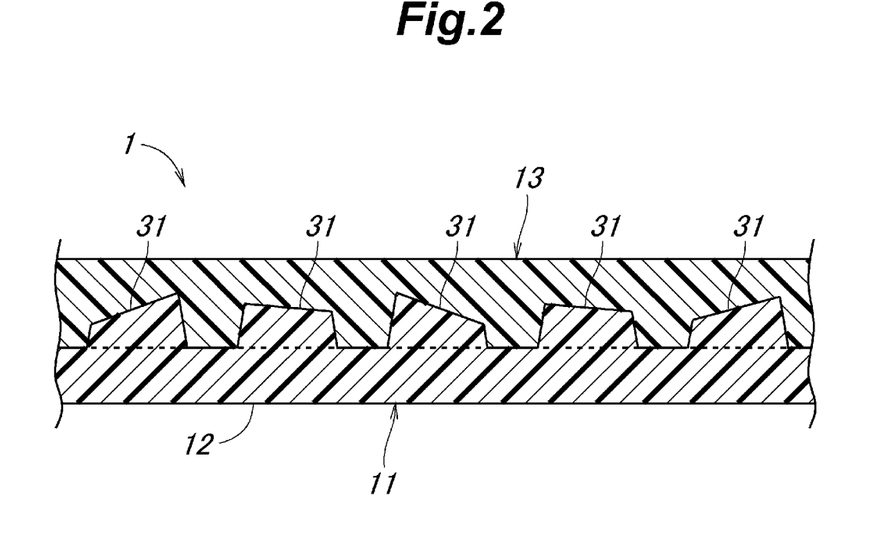
FIG. 2 is a sectional view of the vehicle upholstery member shown in FIG. 1.
Figure 3:
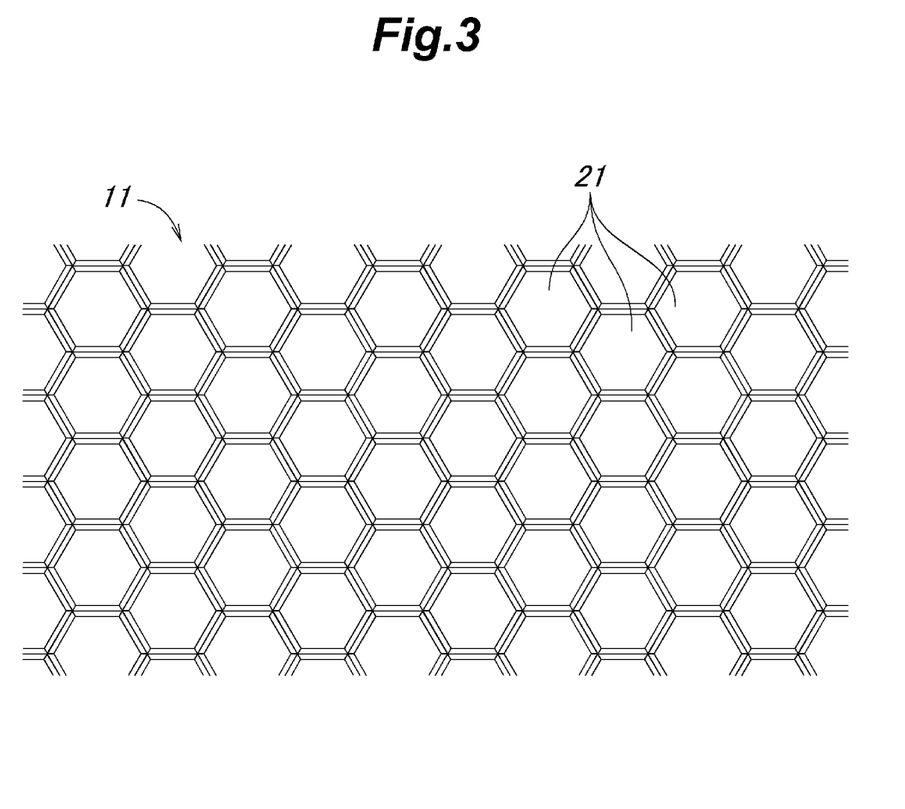
FIG. 3 is a front view of the vehicle upholstery member shown in FIG. 1.
Figure 4:
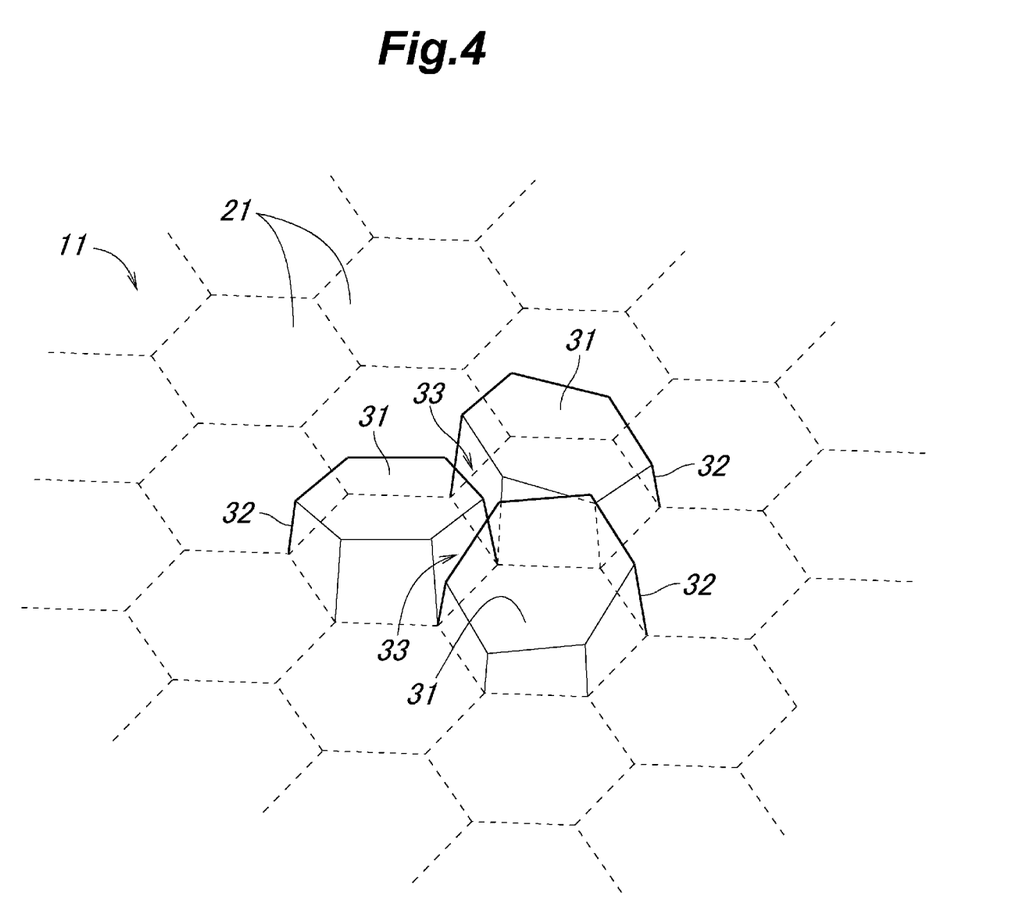
FIG. 4 is a fragmentary perspective view of a base member of the vehicle upholstery member shown in FIG. 1.

FIG. 1 is a perspective view showing a passenger compartment of an automobile in which a vehicle upholstery member 1 according to the present embodiment is adopted. FIG. 2 is a sectional view of the vehicle upholstery member 1 shown in FIG. 1. FIG. 3 is a front view of the vehicle upholstery member 1 shown in FIG. 1. FIG. 4 is a perspective view of a part of a base member 11 of the vehicle upholstery member 1 shown in FIG. 1.

As shown in FIG. 1, the vehicle upholstery member 1 is a decorative panel provided in an interior of an automobile to constitute an instrumental panel 2, a door interior panel 3, and the like of the automobile.

As shown in FIG. 2, the vehicle upholstery member 1 includes a base member 11 extending along a predetermined principal plane 12. The front side of the base member 11 is covered with a covering material or a clear layer 13 having a flat outer surface. The base member 11 and the covering material 13 are each formed of a synthetic resin material. Thereby, the vehicle upholstery member 1 can be formed easily.

Particularly, the covering material 13 is formed of a transparent material such that the external light entering from the front side of the covering material 13 passes through the covering material 13 and is reflected by a surface of the base member 11 and the reflected light enters the eyes of a viewer (occupant). It is to be noted that the covering material 13 is not an indispensable structural element and may be omitted in another embodiment.

As shown in FIG. 3, the base member 11 includes multiple regions 21 each having a predetermined basic shape. The regions 21 are minimum units of the pattern represented by the vehicle upholstery member 1, and the regions 21 have the same basic shape. Thereby, the pattern formed by the regions 21 of the base member 11 can be made conspicuous on the surface of the base member 11, whereby the ornamental effect of the vehicle upholstery member 1 can be improved.

The basic shape of the regions 21 is selected from the group consisting of an equilateral triangle, a square, and a regular hexagon. This allows the regions 21 to be arranged densely (or closely packed together) so that the pattern formed by the regions 21 can be represented clearly or at a high resolution. Particularly, in the present embodiment, the basic shape of each region 21 is a regular hexagon, whereby the regions 21 are arranged in a honeycomb form.

Each side of each region 21 is arranged to extend along a side of the adjacent region 21. Namely, the regions 21 are formed such that the regions 21 that are adjacent to each other share a side. This allows the regions 21 to be arranged densely (or closely packed together) so that the pattern formed by the regions 21 can be represented clearly or at a high resolution.

As shown in FIG. 4, each of the regions 21 of the base member 11 is provided with a flat surface 31 for reflecting the external light. In the present embodiment, each region 21 includes a convex portion 32 such that the top surface of each convex portion 32 constitutes the surface 31 of the region 21. Further, in the present embodiment, the basic shape of each region 21 is a regular hexagon, and accordingly, the convex portion 32 is formed in a truncated hexagonal pyramid shape and the surface 31 has a hexagonal shape.

Further, a groove 33 is formed at a boundary between adjacent ones of the regions 21. Specifically, the groove 33 is formed between adjacent ones of the convex portions 32 because the convex portion 32 of each region 21 is formed in a truncated hexagonal pyramid shape and is tapered toward the surface 31 (top surface). Thereby, the surface 31 of each region 21 can be formed to be flat to a marginal part thereof easily and the outline of each region 21 can be made clear. This can make the pattern formed by the regions 21 clearer.

It is to be noted that in the present embodiment, the basic shape of each region 21 is a regular hexagon, but the basic shape of the regions 21 is not limited to the regular hexagon and may be an equilateral triangle or a square. Also, the basic shape of the regions 21 may be a circle. In this case, adjacent ones of the regions 21 do not share a side.

Figure 5:
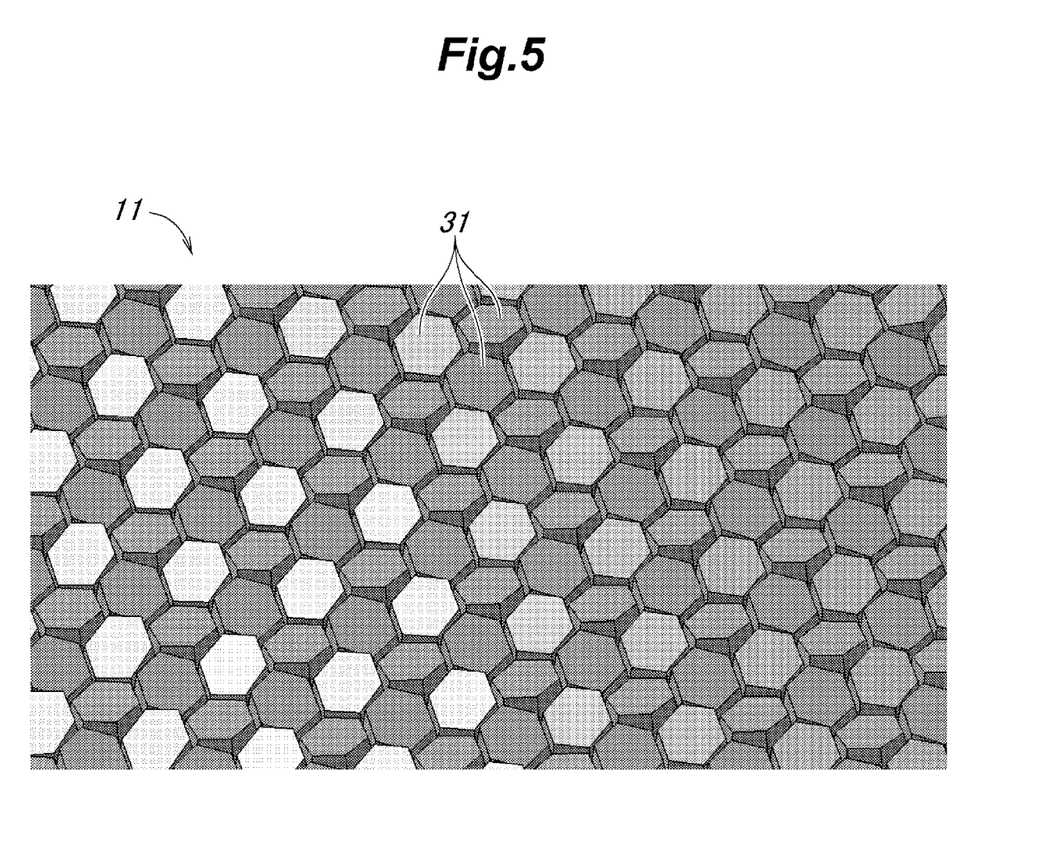
FIG. 5 is a fragmentary perspective view of the base member, showing a wider area of the base member than in FIG. 4.
Figure 6A:
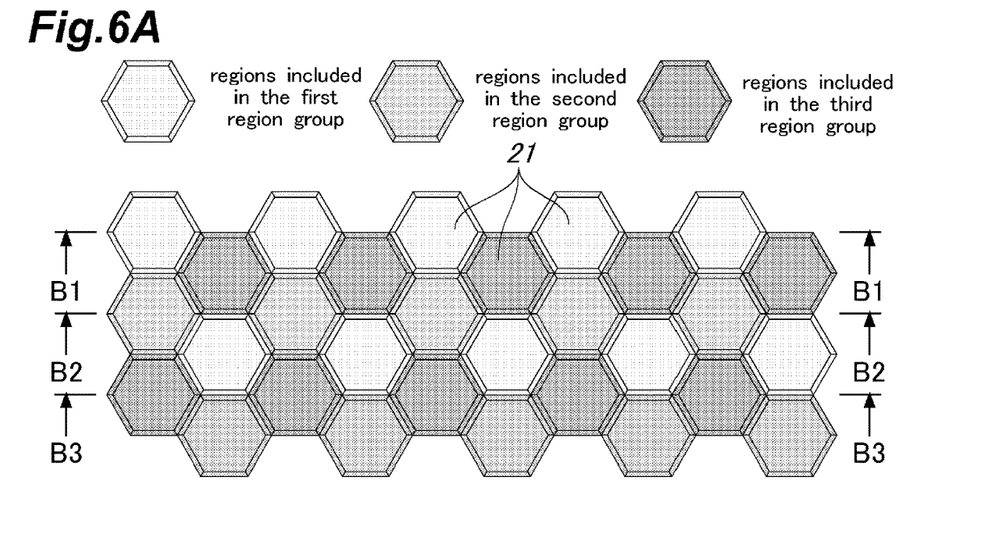
FIG. 6A is a plan view showing the regions of the base member.
Figure 6B:
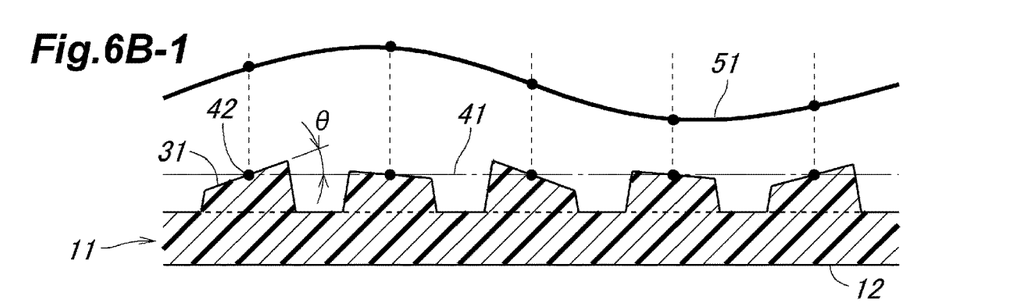
Figure 6B:
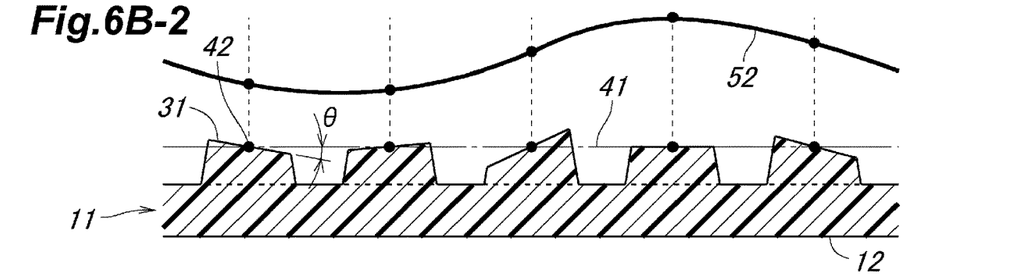
Figure 6B:
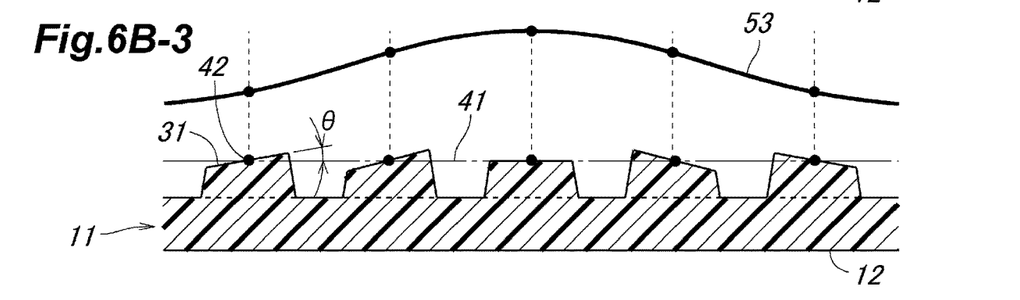
Figure 7A:
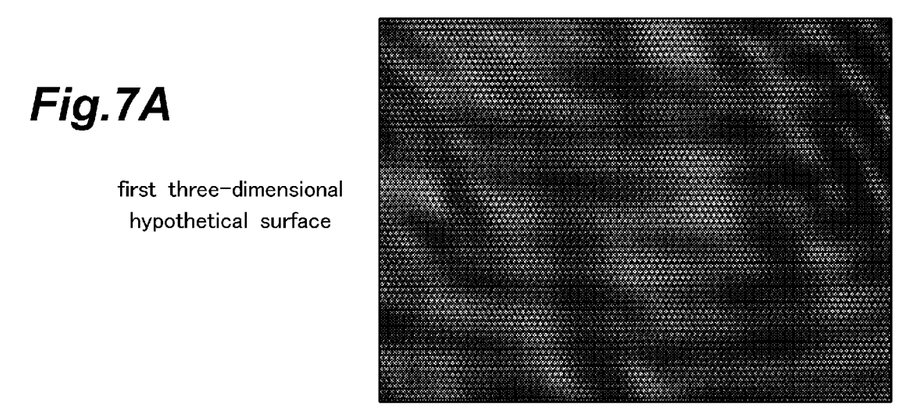
FIG. 7A is a schematic view showing an example of a first three-dimensional hypothetical surface that can be adopted in the vehicle upholstery member shown in FIG. 1.
Figure 7B:
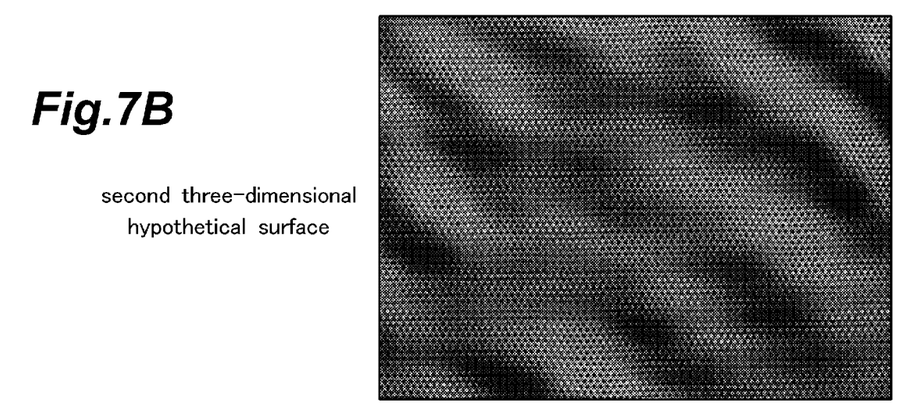
FIG. 7B is a schematic view showing an example of a second three-dimensional hypothetical surface that can be adopted in the vehicle upholstery member shown in FIG. 1.
Figure 7C:
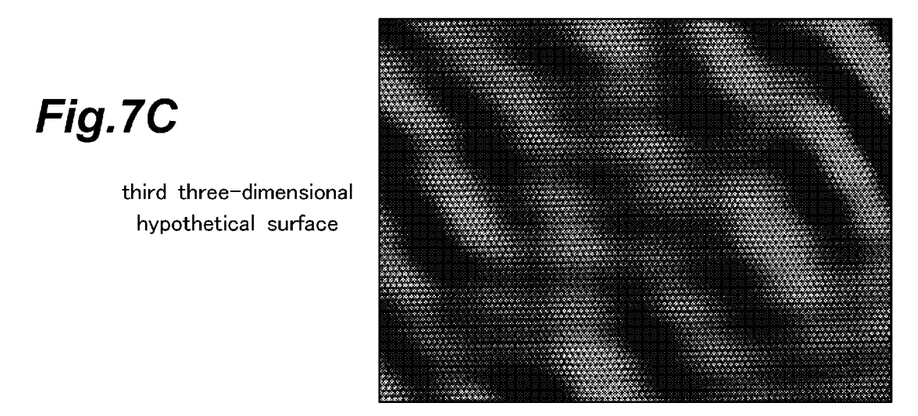
FIG. 7C is a schematic view showing an example of a third three-dimensional hypothetical surface that can be adopted in the vehicle upholstery member shown in FIG. 1.

FIG. 5 is a fragmentary perspective view of the base member 11. FIG. 6A is a plan view of the regions 21 of the base member 11, FIG. 6B-1 is a sectional view taken along line B1-B1 in FIG. 6A, FIG. 6B-2 is a sectional view taken along line B2-B2 in FIG. 6A, and FIG. 6B-3 is a sectional view taken along line B3-B3 in FIG. 6A. FIGS. 7A-7C are schematic views showing an example of three-dimensional hypothetical surfaces 51, 52, 53 that can be adopted in the vehicle upholstery member 1.

The surfaces 31 (top surfaces of the convex portions 32) of the regions 21 of the base member 11 are inclined at various angles (directions) in accordance with a pattern represented by the vehicle upholstery member 1. The variation in the angles of the surfaces 31 causes the reflected light from the surfaces 31 to vary so that bright and dark areas (shades) appear on the front side of the vehicle upholstery member 1 which can be observed as a pattern by the viewer (see FIG. 5).

As shown in FIG. 6A, in the present embodiment, each of the regions 21 provided on one surface of the base member 11 belongs to either one of a first region group, a second region group, and a third region group. The regions 21 of the first region group, the regions 21 of the second region group, and the regions 21 of the third region group represent different patterns. Thereby, it is possible to cause three different patterns to appear on one surface of the single base member 11.

Particularly, in the present embodiment, the surface of the base member 11 is formed of multiple region units each including one region 21 of the first region group, one region 21 of the second region group, and one region 21 of the third region group that are arranged adjacent to each other such that the centers 42 of these regions 21 are respectively positioned on the three vertices of an equilateral triangle. This basic arrangement of the regions 21 of the first to third region groups (region unit) is repeated over the entire surface of the base member 11. Thereby, the regions 21 of the three region groups can be arranged evenly so that the three different patterns can be reproduced evenly.

The regions 21 included in the same region group are arranged in a staggered manner such that the adjacent regions 21 included in the same region interpose therebetween the regions 21 included in the other region groups. Specifically, one of the regions 21 included in the second region group and one of the regions 21 included in the third region group are placed between each adjacent pair of the regions 21 included in the first region group, one of the regions 21 included in the first region group and one of the regions 21 included in the third region group are placed between each adjacent pair of the regions 21 included in the second region group, and one of the regions 21 included in the first region group and one of the regions 21 included in the second region group are placed between each adjacent pair of the regions 21 included in the third region group. To describe the arrangement of the regions 21 shown in FIG. 6A from a different point of view, it can be said that the regions 21 of the first to third regions are arranged in a two-dimensionally alternating manner. Namely, the regions 21 of the first to third regions are arranged such that the regions 21 of the first to third regions appear in turns along each of the two diagonal directions in FIG. 6A.

Further, as shown in FIGS. 6B-1, 6B-2, and 6B-3, the flat surface 31 of each region 21 has a center 42 positioned on a hypothetical reference plane 41 parallel with the principal plane 12. The surface 31 of each region 21 forms an angle θ relative to the hypothetical reference plane 41 such that the surface 31 extends in a tangential direction of one of three-dimensional hypothetical surfaces 51, 52, 53, which are defined along the principal plane 12, at the position corresponding to the center 42 of the region 21.

Particularly, in the present embodiment, three three-dimensional hypothetical surfaces 51, 52, 53 having mutually different shapes are adopted corresponding to the three region groups for representing mutually different patterns, and the surface 31 of each region 21 of each of the three region groups is formed to be inclined relative to the hypothetical reference plane 41 at an angle θ in accordance with the associated one of the three three-dimensional hypothetical surfaces 51, 52, 53.

Specifically, as shown in FIG. 6B-1, regarding the regions 21 included in the first region group, the angle θ of the surface 31 of each region 21 relative to the hypothetical reference plane 41 is set such that the surface 31 extends in the tangential direction of the first three-dimensional hypothetical surface 51, which is defined along the principal plane 12, at the position corresponding to the center 42 of the region 21. Also, as shown in FIG. 6B-2, regarding the regions 21 included in the second region group, the angle θ of the surface 31 of each region 21 relative to the hypothetical reference plane 41 is set such that the surface 31 extends in the tangential direction of the second three-dimensional hypothetical surface 52, which is defined along the principal plane 12, at the position corresponding to the center 42 of the region 21. Further, as shown in FIG. 6B-3, regarding the regions 21 included in the third region group, the angle θ of the surface 31 of each region 21 relative to the hypothetical reference plane 41 is set such that the surface 31 extends in the tangential direction of the third three-dimensional hypothetical surface 53, which is defined along the principal plane 12, at the position corresponding to the center 42 of the region 21.

It is to be noted that, in FIGS. 6B-1, 6B-2, and 6B-3, the three-dimensional hypothetical surfaces 51, 52, 53 are each represented as a two-dimensional curved line for the sake of convenience of illustration and the angle θ of each surface 31 is represented as an angle on a projection plane (or an angle around a single axis perpendicular to the projection plane) corresponding to an angle of a tangent line of the curved line, but actually the three-dimensional hypothetical surfaces 51, 52, 53 are each represented as a three-dimensional curved surface and the angle of each surface 31 is defined as an angle in the three-dimensional space (or an angle around three axes) corresponding to an angle of a tangent plane of the curved surface.

The first three-dimensional hypothetical surface 51, the second three-dimensional hypothetical surface 52, and the third three-dimensional hypothetical surface 53 may represent ripples as shown in FIGS. 7A-7C, for example. The first three-dimensional hypothetical surface 51 shown in FIG. 7A, the second three-dimensional hypothetical surface 52 shown in FIG. 7B, and the third three-dimensional hypothetical surface 53 shown in FIG. 7C represent slightly different states of the ripples.

When setting the angles θ of the surfaces 31 of the regions 21, first, the three-dimensional data of the three-dimensional hypothetical surfaces 51, 52, 53 is generated using a 3D computer graphics software. As in the example shown in FIGS. 7A to 7C, in the case where the three-dimensional hypothetical surfaces 51, 52, 53 represent ripples, the three-dimensional data of a water surface to be imitated is generated. Then, the angles of tangent lines (tangent planes) of the three-dimensional hypothetical surfaces 51, 52, 53 corresponding to the positions of the respective regions 21 are obtained and the obtained angles of the tangent lines are set as the angles θ of the surfaces 31 of the respective regions 21.

As described above, in the present embodiment, the surface 31 of each region 21 of the base member 11 is formed to be inclined relative to the hypothetical reference plane 41 at an angle in accordance with the associated one of the three-dimensional hypothetical surfaces 51, 52, 53. Thereby, the reflected light from the surfaces 31 of the regions 21 of the base member 11 becomes similar to the reflected light that would come from the three-dimensional hypothetical surfaces 51, 52, 53, whereby owing to the optical illusion effect, the viewer (vehicle occupant) perceives as if the irregularities corresponding to the three-dimensional hypothetical surfaces 51, 52, 53 exist on the surface of the base member 11. In the case where the three-dimensional hypothetical surfaces 51, 52, 53 imitating a water surface are adopted, for example, the viewer perceives as if there are ripples of the water surface on the surface of the base member 11. Thus, in the present embodiment, it is possible to cause the viewer to observe, on the surface of the base member 11, the patterns corresponding to the three-dimensional hypothetical surfaces 51, 52, 53, whereby the ornamental effect of the vehicle upholstery member 1 can be improved.

Further, in the present embodiment, because the surfaces 31 of the multiple regions 21 provided on one surface of the base member 11 are arranged in a planar fashion while the angles of the surfaces 31 of the regions 21 are varied to represent patterns, the vehicle upholstery member 1 can represent three-dimensional irregularities such as those on a water surface even when the vehicle upholstery member 1 consists of a thin sheet (film).

In addition, in the present embodiment, the multiple regions 21 provided on one surface of the base member 11 are divided into three region groups representing mutually different patterns and the surface 31 of each region 21 of each of the three region groups is formed to be inclined at an angle in accordance with the associated one of the three three-dimensional hypothetical surfaces 51, 52, 53. Thereby, as the viewpoint of the viewer changes or the direction of external light impinging on the vehicle upholstery member 1 changes, the patterns represented by the three three-dimensional hypothetical surfaces 51, 52, 53 and observed by the viewer may vary. Thus, in the present embodiment, it is possible to cause the viewer to observe, on the surface 31 of the base member 11, different patterns corresponding to the three different three-dimensional hypothetical surfaces 51, 52, 53 and the patterns provide varying ornamental effects depending on the viewing angle, whereby the ornamental effect of the vehicle upholstery member 1 is improved.

Particularly, in the example shown in FIGS. 7A-7C, if the ripples represented by the three three-dimensional hypothetical surfaces 51, 52, 53 are observed by the viewer in turn as the viewpoint of the viewer changes or the direction of external light impinging on the vehicle upholstery member 1 changes, the viewer may perceive a disturbance of a water surface.

Figured 8A-8C, FIGS. 9A-9C, and FIGS. 10A-10C are schematic views showing other examples of the three three-dimensional hypothetical surfaces 51, 52, 53 that can be adopted in the vehicle upholstery member 1 shown in FIG. 1.

Figure 8A:
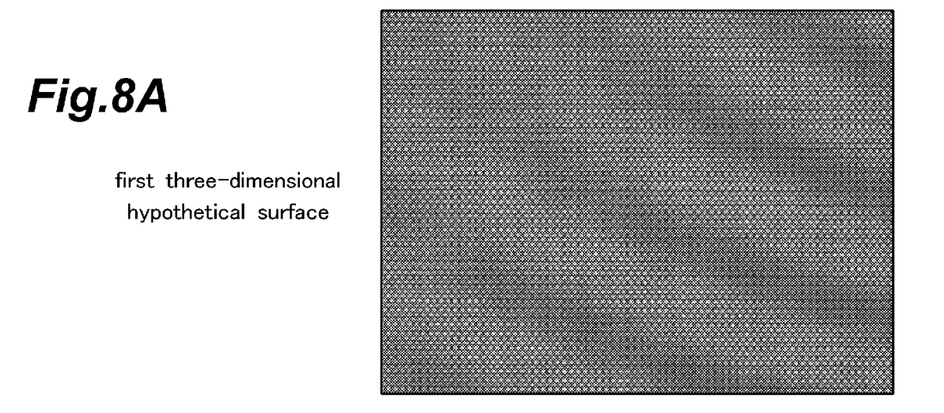
FIG. 8A is a schematic view showing another example of a first three-dimensional hypothetical surface that can be adopted in the vehicle upholstery member shown in FIG. 1.
Figure 8B:
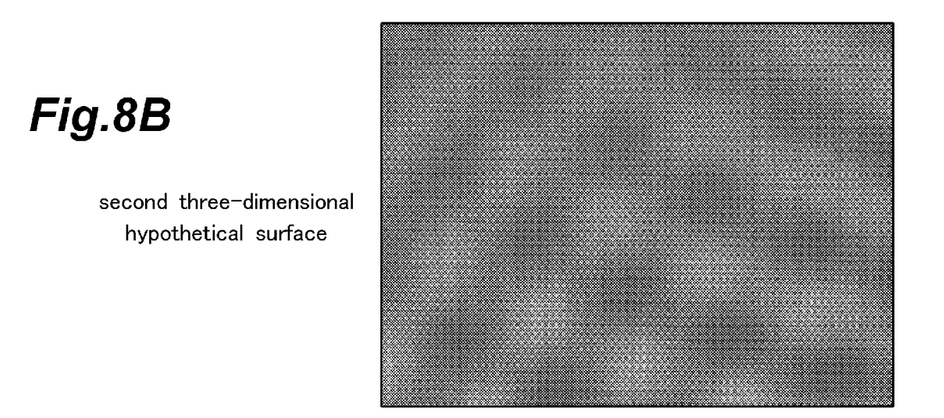
FIG. 8B is a schematic view showing another example of a second three-dimensional hypothetical surface that can be adopted in the vehicle upholstery member shown in FIG. 1.
Figure 8C:
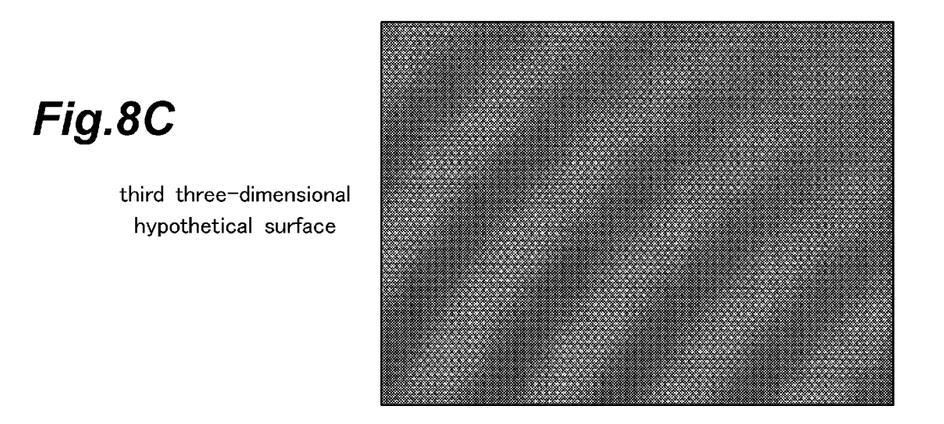
FIG. 8C is a schematic view showing another example of a third three-dimensional hypothetical surface that can be adopted in the vehicle upholstery member shown in FIG. 1.

In the example shown in FIGS. 8A-8C, the three-dimensional hypothetical surfaces 51, 52, 53 are defined to represent ripples. More specifically, the first three-dimensional hypothetical surface 51 represents ripples spreading in one direction, the third three-dimensional hypothetical surface 53 represents ripples spreading in another direction, and the second three-dimensional hypothetical surface 52 represents a state in which the ripples represented by the first three-dimensional hypothetical surface 51 and the ripples represented by the third three-dimensional hypothetical surface 53 are synthesized. In this example, if the ripples represented by the three three-dimensional hypothetical surfaces 51, 52, 53 are observed by the viewer in turn as the viewpoint of the viewer changes or the direction of external light impinging on the vehicle upholstery member 1 changes, the viewer may perceive as if the ripples spreading in two directions appear separately or in an overlapping manner.

Figure 9A:
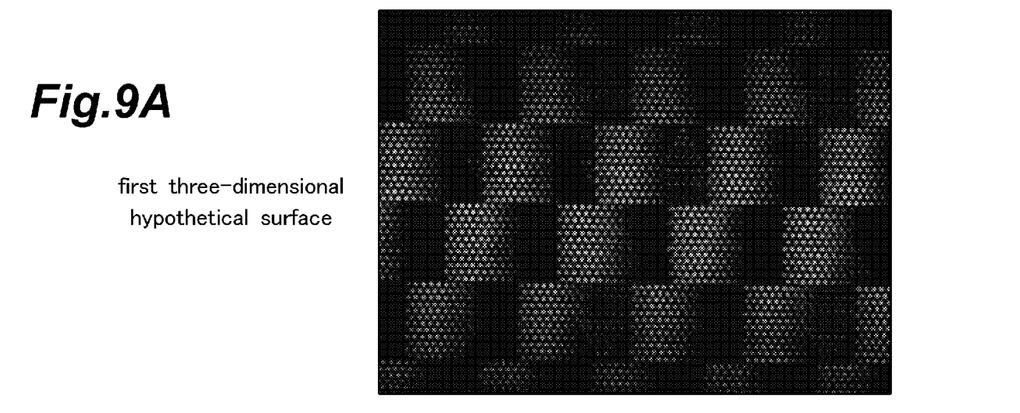
FIG. 9A is a schematic view showing yet another example of a first three-dimensional hypothetical surface that can be adopted in the vehicle upholstery member shown in FIG. 1.
Figure 9B:
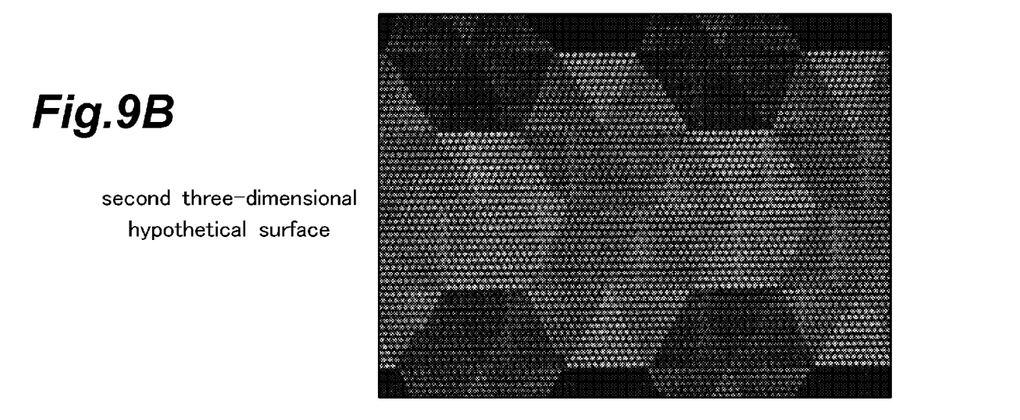
FIG. 9B is a schematic view showing yet another example of a second three-dimensional hypothetical surface that can be adopted in the vehicle upholstery member shown in FIG. 1.
Figure 9C:
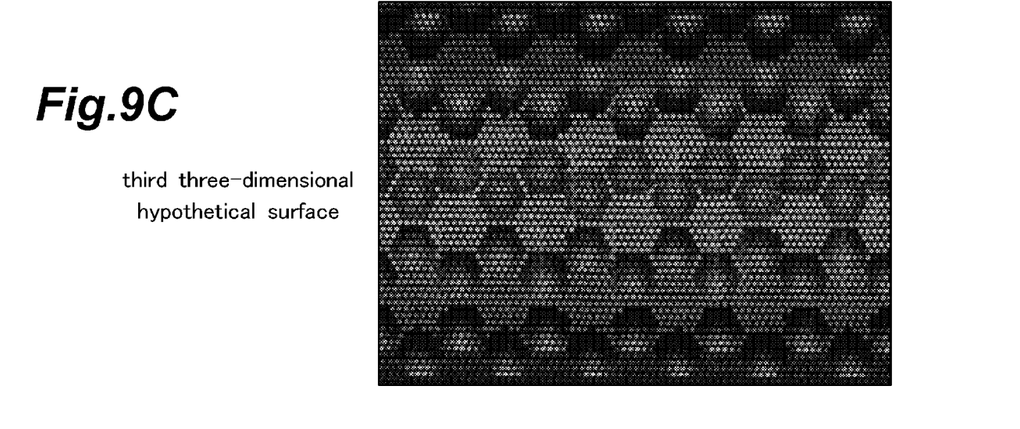
FIG. 9C is a schematic view showing yet another example of a third three-dimensional hypothetical surface that can be adopted in the vehicle upholstery member shown in FIG. 1.

In the example shown in FIGS. 9A-9C, the three-dimensional hypothetical surfaces 51, 52, 53 are defined to represent geometric patterns. The geometric patterns represented by the three-dimensional hypothetical surfaces 51, 52, 53 are different from one another. In this example, if the geometric patterns represented by the three three-dimensional hypothetical surfaces 51, 52, 53 are observed by the viewer in turn as the viewpoint of the viewer changes or the direction of external light impinging on the vehicle upholstery member 1 changes, it may be possible to give an impression of unexpectedness to the viewer.

Figure 10A:
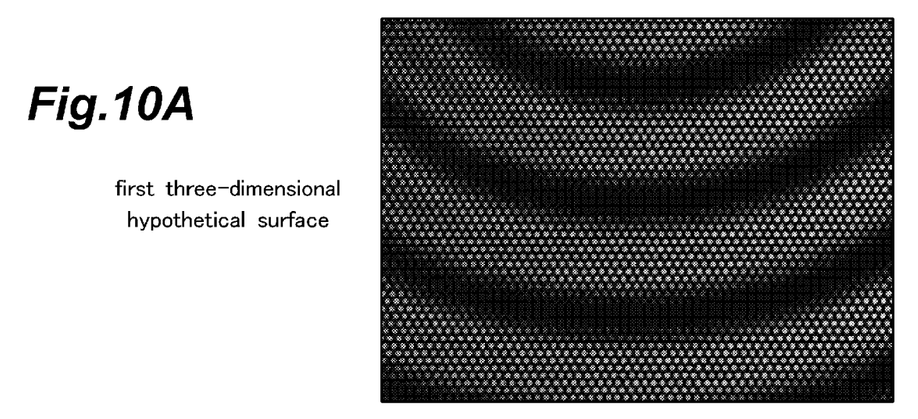
FIG. 10A is a schematic view showing yet another example of a first three-dimensional hypothetical surface that can be adopted in the vehicle upholstery member shown in FIG. 1.
Figure 10B:
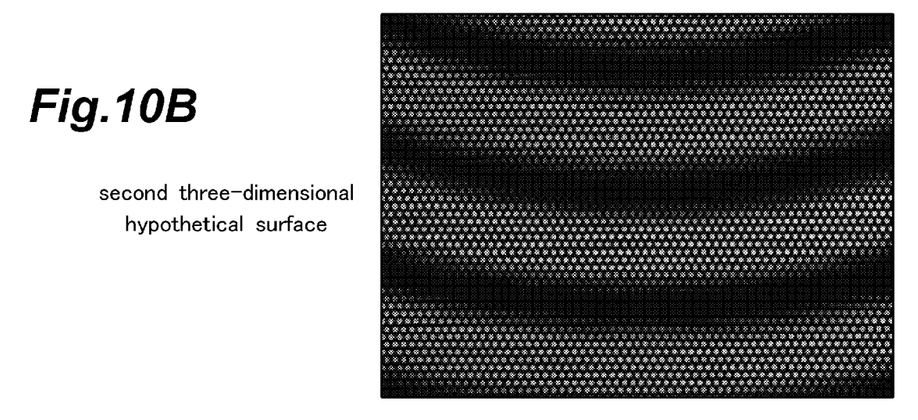
FIG. 10B is a schematic view showing yet another example of a second three-dimensional hypothetical surface that can be adopted in the vehicle upholstery member shown in FIG. 1.
Figure 10C:
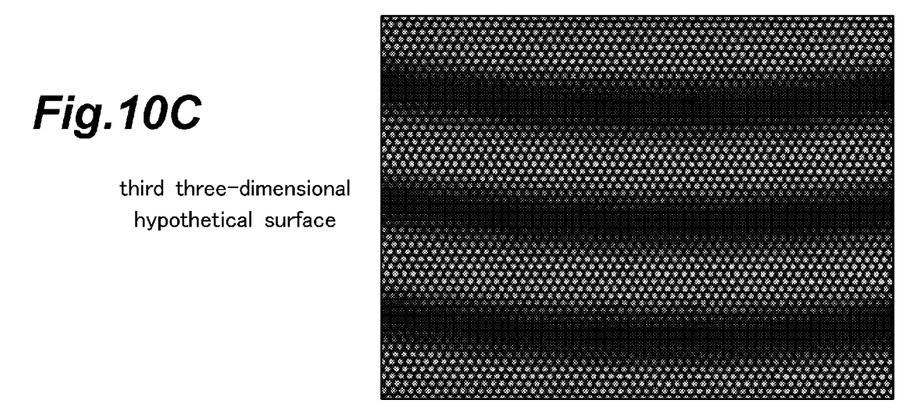
FIG. 10C is a schematic view showing yet another example of a third three-dimensional hypothetical surface that can be adopted in the vehicle upholstery member shown in FIG. 1.

In the example shown in FIGS. 10A-10C, the three-dimensional hypothetical surfaces 51, 52, 53 are defined to represent arc-shaped ripples having different ranges of radius. In this example, if the ripples represented by the three three-dimensional hypothetical surfaces 51, 52, 53 are observed by the viewer in turn as the viewpoint of the viewer changes or the direction of external light impinging on the vehicle upholstery member 1 changes, the viewer may perceive as if the ripples spread on a water surface.

It is to be noted that in the present embodiment, the three-dimensional hypothetical surfaces 51, 52, 53 representing ripples or geometric patterns are adopted such that the vehicle upholstery member 1 three-dimensionally expresses the ripples or geometric patterns, but it is also possible to adopt three-dimensional hypothetical surfaces 51, 52, 53 representing letters (characters), marks, and the like such that the vehicle upholstery member 1 three-dimensionally expresses the letters, marks, and the like. Namely, each three-dimensional hypothetical surface 51, 52, 53 may consist of a smooth continuous curved surface or a contour of a prescribed pattern.

Also, in the present embodiment, the multiple regions 21 of the base member 11 were divided into three region groups and the three three-dimensional hypothetical surfaces 51, 52, 53 were set in correspondence with the three region groups, but the number of the region groups and the number of the three-dimensional hypothetical surfaces are not limited to three, and may be two or more than three.

In such a case, the angles θ of the surfaces 31 of some of the regions 21 relative to the hypothetical reference plane 41 are set such that the surface 31 of each of these regions 21 extends in a tangential direction of one of the three-dimensional hypothetical surfaces at a position corresponding to the center 42 of the region 21, and the angles θ of the surfaces 31 of other some of the regions 21 relative to the hypothetical reference plane 41 are set such that the surface 31 of each of these regions 21 extends in a tangential direction of another one of the three-dimensional hypothetical surfaces at a position corresponding to the center 42 of the region 21.

In the foregoing, the present invention has been described in terms of a preferred embodiment thereof. However, as will be readily appreciated by a person of ordinary skill in the art, the present invention is not limited to such an embodiment and may be modified appropriately within the scope of the present invention. Also, not all of the components shown in the foregoing embodiment are necessarily indispensable, and they may be selectively adopted as appropriate without departing from the scope of the present invention.

The invention claimed is:

1. A vehicle upholstery member serving as a decorative panel provided in an interior of a vehicle, comprising a base member formed of a resin and extending along a predetermined principal plane, wherein the base member includes, on a surface thereof that is visible by an occupant of the vehicle when the vehicle upholstery member is provided in the interior of the vehicle, first, second, and third region groups formed of a resin same as the resin of the base member, each of the first, second, and third region groups comprising multiple regions each having a same basic shape, each of the regions of each of the first, second, and third region groups is provided with a flat surface having a center located on a common hypothetical reference plane parallel with the principal plane, the flat surface of each region of the first region group forms an angle relative to the hypothetical reference plane such that the flat surface of the region extends in a tangential direction of a first three-dimensional hypothetical surface defined along the principal plane at a position corresponding to the center of the region, the flat surface of each region of the second region group forms an angle relative to the hypothetical reference plane such that the flat surface of the region extends in a tangential direction of a second three-dimensional hypothetical surface defined along the principal plane at a position corresponding to the center of the region, the first, second, and third three-dimensional hypothetical surfaces are different from one another, and a basic region arrangement consisting of one region of the first region group, one region of the second region group, and one region of the third region group that are arranged adjacent to each other such that the centers of these regions are respectively positioned on three vertices of an equilateral triangle is repeated over an entire surface of the base member.

2. The vehicle upholstery member according to claim 1, wherein each of the first, second, and third three-dimensional hypothetical surfaces consists of a smooth continuous curved surface or a contour of a prescribed pattern.

3. The vehicle upholstery member according to claim 2, wherein the basic shape of each region is a regular hexagon.

4. The vehicle upholstery member according to claim 1, wherein the basic shape of the regions is selected from a group consisting of an equilateral triangle, a square, and a regular hexagon.

5. The vehicle upholstery member according to claim 4, wherein each side of each region is arranged to extend along a side of another region adjacent thereto.

6. The vehicle upholstery member according to claim 1, wherein the regions are closely packed together.

7. The vehicle upholstery member according to claim 6, wherein a groove is defined at a boundary between adjacent ones of the regions.

8. The vehicle upholstery member according to claim 1, wherein the base member constitutes an instrumental panel.

9. The vehicle upholstery member according to claim 1, further comprising a clear layer covering the regions and having a flat outer surface.

\* \* \* \* \*